(12) United States Patent
Kano et al.

(10) Patent No.: US 7,275,853 B2
(45) Date of Patent: Oct. 2, 2007

(54) ILLUMINATING DEVICE, LIGHT GUIDE BODY AND LIQUID CRYSTAL DISPLAY DEVICE

(75) Inventors: Mitsuru Kano, Fukushima-ken (JP); Hiroyasu Miyata, Miyagi-ken (JP); Tatsumaro Yamashita, Miyagi-ken (JP); Mitsuo Ohizumi, Fukushima-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 195 days.

(21) Appl. No.: 10/716,684

(22) Filed: Nov. 19, 2003

(65) Prior Publication Data

US 2004/0165370 A1   Aug. 26, 2004

(30) Foreign Application Priority Data

Nov. 28, 2002  (JP)  ............................ 2002-345973

(51) Int. Cl.
*F21V 7/04* (2006.01)
(52) U.S. Cl. ...................... 362/620; 362/621; 362/612; 362/617
(58) Field of Classification Search .................. 362/31, 362/600, 601–629; 359/628
See application file for complete search history.

(56) References Cited

U.S. PATENT DOCUMENTS

| 6,104,453 | A |   | 8/2000 | Watanabe |
| 6,366,409 | B1 | * | 4/2002 | Umemoto et al. .......... 359/628 |
| 6,474,824 | B1 | * | 11/2002 | Wada .......................... 362/31 |
| 6,734,929 | B2 | * | 5/2004 | Sugiura et al. ............... 349/65 |
| 6,816,214 | B1 |   | 11/2004 | Ohsumi |
| 7,040,796 | B2 | * | 5/2006 | Sugiura et al. ............. 362/608 |
| 2003/0227768 | A1 | * | 12/2003 | Hara et al. ..................... 362/31 |

* cited by examiner

*Primary Examiner*—Sandra O'Shea
*Assistant Examiner*—Anabel Ton
(74) *Attorney, Agent, or Firm*—Brinks Hofer Gilson & Lione

(57) ABSTRACT

An illuminating device is disclosed., which is high brightness and able to reduce leaking light and preferably made thin. A front light has a light guide plate, a bar light guide body and a light emitting element. A prism shape for reflecting propagating light within the light guide plate and emitting this propagating light to the side of an emitting face of the light guide plate is formed on the emitting face of the light guide plate.

12 Claims, 4 Drawing Sheets

ILLUMINATING DEVICE, LIGHT GUIDE BODY AND LIQUID CRYSTAL DISPLAY DEVICE

This application claims the benefit of Japanese Patent Application No. 2002-345973 filed on Nov. 28, 2002, which is incorporated herein by reference.

BACKGROUND OF THE INVENTION

1. Field of the Invention

The present invention relates to an illuminating device, a light guide body and a liquid crystal display device.

2. Description of the Related Art

The illuminating device such as a front light, a back light, etc. used in the liquid crystal display device, etc. is basically constructed by a light guide plate and a light source arranged on its side end face. An illuminated body such as a liquid crystal panel, etc. is illuminated by reflecting light introduced from the side end face of the light guide plate by a prism shape formed on the face on the side opposed to the emitting face of the light guide plate and emitting this light from the emitting face (for example, see patent literature 1).

FIGS. 6A and 6B are views showing a sectional structure of the liquid crystal display device having each of these conventional illuminating devices, etc. FIG. 7 is an explanatory view for explaining a light guide state of the front light shown in FIG. 6A. FIG. 8 is an explanatory view for explaining a light guide state of the back light shown in FIG. 6B.

The liquid crystal display device shown in FIG. 6A is constructed by a liquid crystal panel 120 and a front light 110 arranged on its front face side (upper face side in this figure). In the front light 110, reference numerals 112, 113 and 115 respectively designate a light guide plate, a bar light guide body and an LED (light emitting diode). A projecting stripe 114 of a triangular shape in section constructed by a gentle slanting face portion 114a and a steep slanting face portion 114b is continuously formed on the upper face of the light guide plate 112. In the liquid crystal panel 120, reference numerals 121, 122, 123 and 124 respectively designate an upper substrate, a lower substrate, a liquid crystal layer and a sealant. An unillustrated reflection plate is arranged on the outer or inner face side of the lower substrate 122 in the liquid crystal panel 120.

The liquid crystal display device shown in FIG. 6B is constructed by a liquid crystal panel 140 and a back light 130 arranged on its rear face side (lower face side in this FIG.). The liquid crystal panel 140 is set to a transmission type having no reflection layer, or a semi-transmission reflection type in which the reflection layer is partially arranged. The other basic constructions are similar to those of FIG. 6A. In the back light 130, reference numerals 132 and 133 respectively designate a light guide plate and a light source (for example, a cold cathode tube). Plural grooves 134 of a wedge shape in section are formed on the lower face of the light guide plate 132.

[Patent Literature 1]

Japanese Unexamined Published. Patent Application No. H11-109347

In the front light 110 shown in FIG. 6A, as shown in FIG. 7, light introduced from the bar light guide body 113 into the light guide plate 112 is propagated while this light is repeatedly totally reflected within the light guide plate 112. The light incident two the steep slanting face portion 114b is mainly emitted from the emitting face 112b of the light guide plate 112 (lights A, B shown in FIG. 7). However, with respect to the light incident to the steep slanting face portion 114b similarly to the lights A, B, as shown by lights C, D shown in FIG. 7, there is a case in which light incident to the slanting face portion at an incident angle shallower than that of each of the lights A, B is transmitted through the steep slanting face portion 114b and is leaked out to the upper face side of the liquid crystal display device. This is because the incident angles of the lights C, D become shallow over a critical angle in the light guide plate 112 and the air. Since such lights C, D are not utilized as illumination light, these lights C, D reduce brightness of the front light 110 and become a cause reducing contrast with respect to the display in which these lights are transmitted through the light guide plate 112.

Further, in the liquid crystal display device shown in FIG. 6B, as shown in FIG. 8, one portion of light propagated within the light guide plate 132 is incident to the lower face 132b of the light guide plate 132 at a shallow incident angle over the critical angle, and is transmitted outward from the lower face 132b so that this light portion is lost. Further, the shape of the back light 130 shown in FIG. 6B is a shape generally used at present. However, in the back light of this kind, the light emitted from the light guide plate 132 to the liquid crystal panel 140 side includes many components shifted from the direction perpendicular to the light guide plate 132 and slantingly emitted. Therefore, a problem exists in that the utilization efficiency of light after the emission from the back light 130 is reduced. A prism sheet 137 for directing the emitted light of the back light 130 to the direction perpendicular to the light guide plate was arranged between the light guide plate 132 and the liquid crystal panel 140 to solve this problem. However, in this construction, it is difficult to make the liquid crystal display device thin and the problem,of an increase in cost is caused.

SUMMARY OF THE INVENTION

The present invention is made in consideration of the above situation, and embodiments of the present invention provide an illuminating device having high brightness and reducing leaked light and able to be preferably made thin.

Embodiments of the present invention also provide a light guide plate able to efficiently uniformly propagate light introduced from the light incident face to the emitting face.

Embodiments of the present invention also provide a liquid crystal display device having the above illuminating device and having high brightness and excellent in display quality.

An illuminating device in the present invention is characterized in that the illuminating device comprises a light source and a light guide plate for introducing light of the light source from a side end face to the interior and emitting the light propagated in the interior from an emitting face; and a prism shape for reflecting the propagating light within the light guide plate and emitting the propagating light to the emitting face side is formed on the emitting face of the light guide plate.

In accordance with such a construction, it is possible to effectively prevent the light propagated within the light guide plate from being leaked out of the face on the side opposed to the emitting face. Accordingly, for example, if the illuminating device of the above construction is used as the front light of a display device, the leaking light in the front face direction of the display device can be greatly reduced and the display of high contrast can be obtained. Further, the face on the side opposed to the emitting face of the light guide plate can be set to a flat face. Accordingly, when the present invention is applied to the front light of the display device, the above flat face is arranged on the display face side so that the advantage of being able to protect the above prism shape is obtained.

The illuminating device of the present invention can be constructed such that the prism shape is constructed by plural projecting stripes formed on the emitting face, and a slanting face portion is formed on an advancing direction side of the propagating light of the projecting stripe.

In accordance with such a construction, the light guide plate for emitting the above propagating light from the emitting face can be easily constructed. No shape of the above projecting stripe is particularly limited if the projecting stripe has the above slanting face portion.

In the illuminating device in the present invention, the angle formed between the advancing direction of the propagating light incident to the slanting face portion and the advancing direction of reflected light of the propagating light is preferably an obtuse angle.

In accordance with such a construction, it is possible to effectively prevent the light incident to the slanting face portion of the projecting stripe from being transmitted through the above slanting face portion and leaked out. Accordingly, the light amount reflected on the above slanting face portion and illuminating an illuminated body can be increased so that the illuminating device of high brightness can be provided.

In the illuminating device in the present invention, the angle formed between the, advancing direction of the propagating light incident to the slanting face portion and the advancing direction of the reflected light of the propagating light is preferably set to 90° or more and 150° or less.

In accordance with such a construction, the light amount transmitted through the above slanting face portion and leaked can be more effectively reduced so that the illuminating device of high brightness can be provided.

In the illuminating device in the present invention, the inner face of the slanting face portion is preferably formed so as to be directed to the outer face side of the emitting face. In accordance with such a construction, the illuminating device able to efficiently emit the above propagating light to the emitting face side of the light guide plate by the above slanting face portion is obtained.

After the above propagating light is introduced from the light source to the light guide plate, the propagating light is advanced while the propagating light is repeatedly totally reflected on the upper and lower faces of the light guide plate. Therefore, the propagating light becomes light scattered to a certain extent. An angle distribution of the propagating light with respect to the horizontal face is changed in accordance with the propagating distance within the light guide plate. For example, in the light guide plate manufactured by acrylic resin and having 1 mm in thickness, the angle distribution of about ±40° is formed in the vicinity of the light source. In the position separated by about 50 mm from the light source, the angle distribution of about ±20° is formed. Accordingly, more uniform illumination light can be obtained by setting the inclination angle of the slanting face portion in accordance with the angle distribution of this propagating light.

The illuminating device in the present invention can be also constructed such that the projecting stripe is approximately formed in a trapezoidal shape seen in section in which a flat portion is formed in the top portion of the projecting stripe.

In accordance with such a construction, since the top portion of the projecting stripe is set to the flat portion, no propagating light incident to the emitting face except for both the above slanting face portions is easily leaked to the outside. Accordingly, the ratio of the light reflected by the above slanting face portion and advanced in an intended direction can be increased so that the brightness of the illuminating device can be substantially raised.

Further, the illuminating device in the present invention may be also constructed such that the projecting stripe is formed in a wedge shape seen in section.

In the illuminating device in the present invention, the inclination angle of the slanting face portion is preferably set to 40° or more and 60° or less.

The above inclination angle is an angle formed between a horizontal reference face of the above light guide plate and the above slanting face portion. In accordance with such a construction, the light incident to the above slanting face portion can be efficiently reflected so that the illuminating device of high brightness can be formed. Further, the leaking light in the above slanting face portion can be reduced. Accordingly, when the illuminating device is used in the front light, the display of high contrast is easily obtained.

The illuminating device in the present invention can be constructed such that the light source has a bar light guide body arranged along the side end face of the light guide plate, and also has a light emitting element arranged in an end face portion of the bar light guide body.

In accordance with such a construction, since the light is uniformly propagated by the above bar light guide body in its extending direction, the light incident to the side end face of the light guide plate attains a state in which this light is uniformly distributed within this side end face. As a result, the light amount distribution within the emitting face of the light guide plate can be uniform.

A light guide body in the present invention is characterized in that the light guide body comprises a side end face for introducing light to the interior, and an emitting face for emitting the light introduced from the side end face and propagated in the interior, and the side end face and the emitting face are formed in directions crossing each other, and plural projecting stripes for reflecting the propagating light within the light guide plate and emitting the propagating light to the emitting face side are formed on the emitting face, and the projecting stripe has a slanting face portion on its propagating light advancing direction side.

In accordance with such a light guide body, the light introduced from the side end face can be efficiently emitted from the emitting face. Accordingly, the suitable light guide body can be provided as an element for face-emitting light by using a point light source. If the above light guide body is arranged in the crossing direction of the arranging face of the light source and the emitting face, the light guide body can be applied to various shapes such as a flat plate shape, a bar shape, etc.

The liquid crystal display device in the present invention is characterized in that the above-mentioned illuminating device of the present invention is arranged on the front face or the rear face of a liquid crystal panel. In accordance with such a construction, the liquid crystal display device, for obtaining the display of high brightness can be provided. In particular, if the above illuminating device is arranged on the front face of the liquid crystal panel, the liquid crystal display device for obtaining the display of high contrast can be provided in comparison with the conventional case.

DESCRIPTION OF THE PREFERRED EMBODIMENTS

The embodiment modes of the present invention will next be explained with reference to the drawings.

Figure 1:
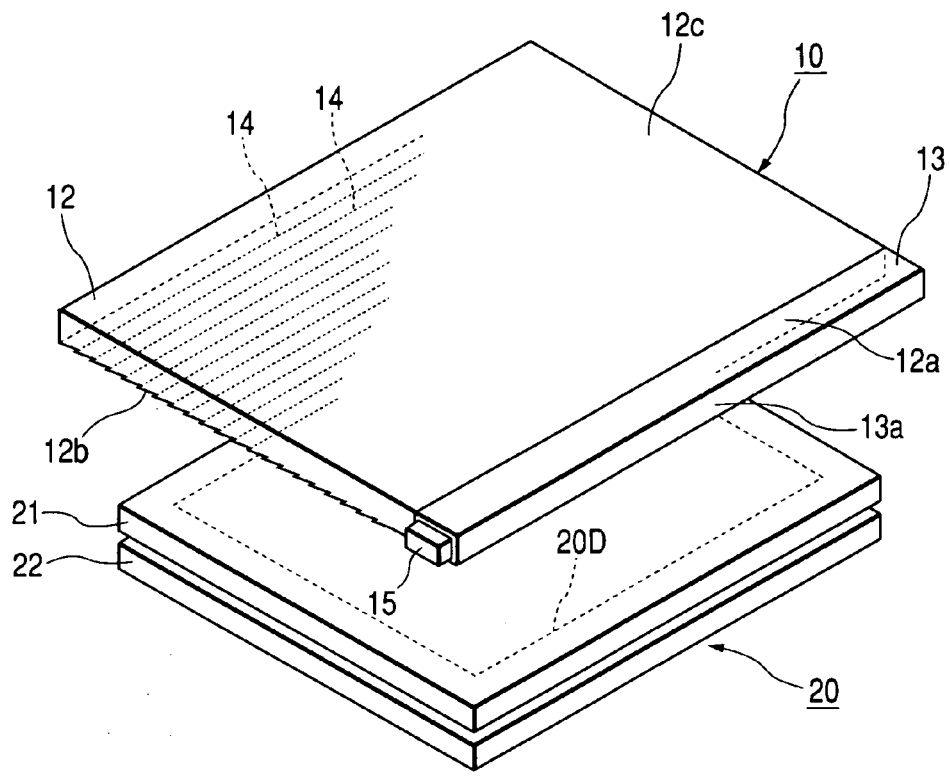
FIG. 1 is a perspective constructional view showing a liquid crystal display device in one embodiment mode of the present invention.
Figure 2:
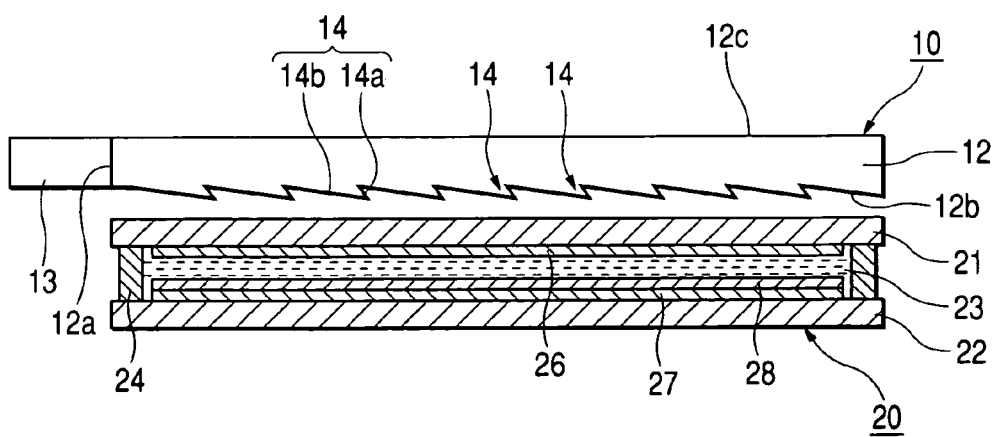
FIG. 2 is a sectional constructional view of the liquid crystal display device shown in FIG. 1.
Figure 3:
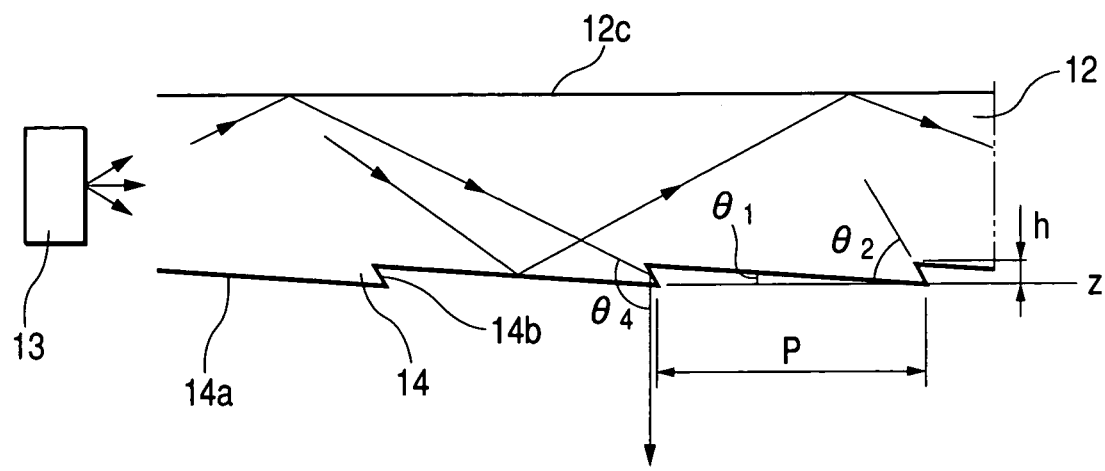
FIG. 3 is a partial sectional constructional view for explaining the light guide state of a front light shown in FIG. 2.

FIG. 1 is a perspective constructional view of a liquid crystal display device having a front light in one embodiment mode of the present invention. FIG. 2 is a sectional constructional view of the liquid crystal display device shown in FIG. 1. FIG. 3 is a partial sectional constructional view for explaining a light guide state of the front light shown in FIG. 2. As shown in FIGS. 1 and 2, the liquid crystal display device of this embodiment mode is constructed by arranging the front light (illuminating device) 10 and a liquid crystal panel 20 arranged on its rear face side (lower face side in these figure).

As shown in FIG. 1, the front light 10 is constructed by arranging a transparent light guide plate 12 approximately formed in a flat plate shape, a bar light guide body 13 arranged along its side end face 12a, and a light emitting element 15 arranged on at least one end face of this bar light guide body 13 in its length direction. Namely, in the front light 10 in this embodiment mode, the light emitting element 15 and the bar light guide body 13 are set to a light source, and the side end face 12a of the light guide plate 12 is set to a light incident face of the light guide plate.

As shown in FIG. 2, a liquid crystal panel side face (lower face in this FIG.) 12 of the light guide plate 12 is approximately formed in a saw blade shape in section in which plural projecting stripes 14 approximately extending in parallel with the side end face 12a of the light guide plate 12 are arranged and formed.

The liquid crystal panel 20 constitutes the liquid crystal display device of a reflection type constructed by arranging an upper substrate 21 and a lower substrate 22 oppositely arranged. An area 20D of a rectangular shape shown by a dotted line in FIG. 1 is set to a display area of the liquid crystal panel 20, and unillustrated pixels are formed in a matrix shape within the display area 20D.

In the liquid crystal display device of the above construction, the light guide plate 12 is arranged on the display area 20D of the liquid crystal panel 20, and the display of the liquid crystal panel 20 can be visualized through this light guide plate 12. In a dark place in which no external light is obtained, the light emitting element 15 is turned on, and light emitted from this light emitting element 15 is introduced from the light incident face 12a of the light guide plate 12 into the light guide plate through the bar light guide body 13. Further, the light (propagating light) propagated within the light guide plate is emitted from the illustrated lower face (emitting face) 12b side of the light guide plate 12 toward the liquid crystal panel 20, and illuminates the liquid crystal panel 20.

As shown in FIGS. 2 and 3, the light guide plate 12 of the front light 10 is a member of a flat plate shape arranged on the display area of the liquid crystal panel 20 and emitting the light emitted from the light emitting element 15 from the emitting face 12b side to the liquid crystal panel 20, and is constructed by transparent acrylic resin, etc. As shown by the partial sectional view of FIG. 2, the plural projecting stripes 14 are formed in a stripe shape seen from a plane in parallel with each other on the emitting face 12b of the light guide plate 12 so that a prism shape is formed. A face (opposed face) 12c on the side opposed to the emitting face 12b is formed into a flat face.

As shown in FIG. 3, the projecting stripe 14 formed on the emitting face 12b has a wedge shape in longitudinal section constructed by a pair of slanting face portions slantingly formed with respect to a horizontal reference face z of the emitting face 12b. One of these slanting face portions is set to a gentle slanting face portion 14a, and the other is set to a steep slanting face portion (slanting face portion) 14b formed at an inclination angle steeper than that of this gentle slanting face portion 14a. The above gentle slanting face portion 14a is formed so as to have an inclination angle $\theta_1$ with respect to the horizontal reference face z of the emitting face 12b. The steep slanting face portion 14b is formed so as to have an inclination angle $\theta_2$ with respect to the horizontal reference face z. The inclination directions of both the gentle and steep slanting face portions are set to the same direction with respect to the normal line of the horizontal reference face z. Namely, the steep slanting face portion 14b is formed such that the outer face of the steep slanting face portion 14b is directed to the opposite face 12c side of the light guide plate 12 and the inner face of the steep slanting face portion 14b is directed to the outside of the emitting face 12b.

Light propagated from the left-hand side (bar light guide body 13 side) to the right-hand side in FIG. 3 within the light guide plate 12 is reflected on the emitting face 12b side by the steep slanting face portion 14b of the emitting face 12b, and is emitted toward the liquid crystal panel 20 arranged on the rear face side of the light guide plate 12.

Figure 4:
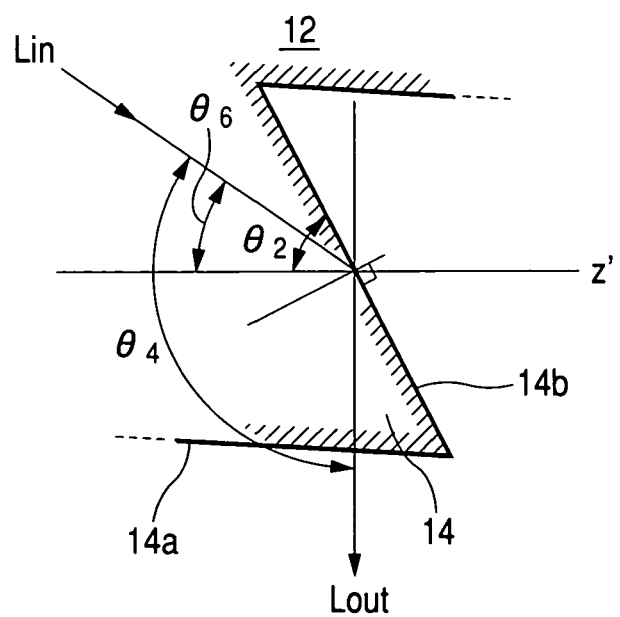
FIG. 4 is a partial sectional constructional view for explaining the reflecting state of propagating light using a projecting stripe 14 shown in FIG. 3

Here, the reflection action of the propagating light using the above steep slanting face portion 14b will be explained with reference to FIGS. 3 and 4. FIG. 4 is a partial sectional constructional view enlargedly showing the steep slanting face portion 14b shown in FIG. 3. In the front light 10 in this embodiment mode, as shown in FIG. 4, the above steep slanting face portion 14b is formed so as to have the inclination angle $\theta_2$ such that the angle $\theta_4$ formed between propagating light $L_{in}$ incident to the steep slanting face portion 14b from the interior of the light guide plate 12 and reflection light $L_{out}$ of the above propagating light $L_{in}$ using the steep slanting face portion 14b is an obtuse angle. Namely, the propagating light $L_{in}$ is incident to the steep slanting face portion 14b at an incident angle exceeding 45° in the forming position of this steep slanting face portion 14b (projecting stripe 14). Thus, it is possible to prevent the transmission of the propagating light $L_{in}$ incident to the steep slanting face portion 14b at its maximum. As a result, the light amount reflected by the steep slanting face portion 14b is increased and brightness of the front light 10 is improved.

The prevent inventors have verified that the illumination light amount of the front light 10 can be increased by optimizing the inclination angle of the above steep slanting face portion 14b, which will be described in detail in the embodiments described later.

In the front light 10, the inclination angle $\theta_1$ of the gentle slanting face portion 14a shown in FIG. 3 is preferably set to the range of 0.5° or more and 5° or less with respect to the horizontal reference face z. The inclination angle $\theta_2$ of the steep slanting face portion 14b is preferably set to the range of 40° or more and 60° or less. If such ranges are set, the light propagated within the light guide plate 12 face can be efficiently emitted to the liquid crystal panel 20 so that the liquid crystal display device able to perform bright display can be constructed. The average brightness of the front light is reduced when the range of the inclination angle $\theta_1$ of the gentle slanting face portion 14a is less than 0.5°. In contrast to this, when the range of the inclination angle $\theta_1$ exceeds 5°, it is difficult to uniformly distribute the emitting light within the light guide plate face. Further, when the inclination angle $\theta_2$ of the steep slanting face portion 14b is less than 40° and exceeds 60°, it is not preferable since the light amount transmitted through the steep slanting face portion 14b and leaked out is increased and the emitting light amount (i.e., the brightness of the front light 10) from the emitting face 12b is reduced.

Further, in the front light 10 of this embodiment mode, the pitch P (the interval of the top portion of a prism groove 14 or the interval of a bottom top portion) of the projecting stripe 14 is constantly set within the emitting face 12b face of the light guide plate. Further, in the case of the front light 10 of this embodiment mode, the height h (the distance between the horizontal reference face z and the bottom top portion of the projecting stripe 14) of the projecting stripe 14 is also constantly set within the face of the emitting face 12b.

The pitch P and the height h of the projecting stripe 14 are not necessarily constantly set within the face of the emitting face 12b. Even when the projecting stripe 14 is formed by changing the pitch P and the height h, it does not exceed the technical scope of the present invention. Further, even when the projecting stripe 14 is formed by changing the inclination angles $\theta_1$ and $\theta_2$ of each projecting stripe 14, it also does not exceed the technical scope of the present invention.

The bar light guide body 13 is a bar-shaped member constructed by a material such as transparent acrylic resin, etc., and is arranged along the side end face 12a of the light guide plate 12. An unillustrated prism shape is formed on the rear face (face on the side opposed to the light guide plate 12) of this bar light guide body 13 so that light introduced from an end face of the bar light guide body 13 and propagated in the longitudinal direction of the bar light guide body 13 can be uniformly irradiated onto the side end face 12a of the light guide plate 12.

The liquid crystal panel 20 is constructed such that a liquid crystal layer 23 is nipped and supported between an upper substrate 21 and a lower substrate 22 oppositely arranged, and is sealed by a sealant 24 arranged in the shape of a planar frame along the inner face side circumferential edge portions of the substrates 21, 22. A liquid crystal control layer 26 is formed on the inner face side (lower substrate 22 side) of the upper substrate 21. A reflection layer 27 having a metallic thin film for reflecting the illumination light of the front light 10 and external light is formed on the inner face side (upper substrate 21 side) of the lower substrate 22. A liquid crystal control layer 28 is formed on this reflection layer 27.

The liquid crystal control layers 26, 28 are constructed by including an electrode, an orientation film, etc. for operating and controlling the liquid crystal layer 23, and also include a semiconductor element, etc. for switching this electrode. Further, a color filter for color display may be also arranged in a certain case.

The reflection layer 27 has a reflection film constructed by a metallic thin film of aluminum, sliver, etc. of high reflectivity for reflecting the external light incident to the liquid crystal display panel 20 and the illumination light of the front light 10. It is preferable to arrange a light scattering means for intensifying the reflection light in a specific direction and preventing a reduction in visibility of the liquid crystal display device. A structure for forming the reflection film in an irregular shape, a scattering film obtained by dispersing resin beads of a reflective index different from that of a material constituting a resin film into the resin film, etc. can be used as this light scattering means.

In the liquid crystal display device of this embodiment mode having the above construction, the prism shape is formed on the emitting face 12b of the light guide plate 12 of the front light 10 arranged on the front face of the liquid crystal panel 20. The steep slanting face portion 14b of the projecting stripe 14 of the emitting face 12b is formed so as to generate obtuse reflection light with respect to the propagating light incident from the interior of the light guide plate 12. Thus, the reflectivity of the propagating light incident to the steep slanting face portion 14b can be improved so that the brightness of the illumination light can be raised. Further, since the reflectivity of the steep slanting face portion 14b is improved as mentioned above, the leaking light amount in the front face direction (above the front light 10) of the liquid crystal display device is reduced. Further, since the above prism shape is formed on the face opposed to the liquid crystal panel 20, there is no fear of damage of the projecting stripe 14 and durability is excellent in comparison with the conventional front light.

Accordingly, in accordance with the liquid crystal display device of the present invention, the display of high quality of high brightness and high contrast is obtained in the reflection display in which the front light 10 is turned on.

Further, since the uppermost face of an observer side is set to a flat face, there are also the merits that light transmittance is improved in arranging an input device and safe installation can be performed.

(Other Modes of Illuminating Device)

Figure 5:
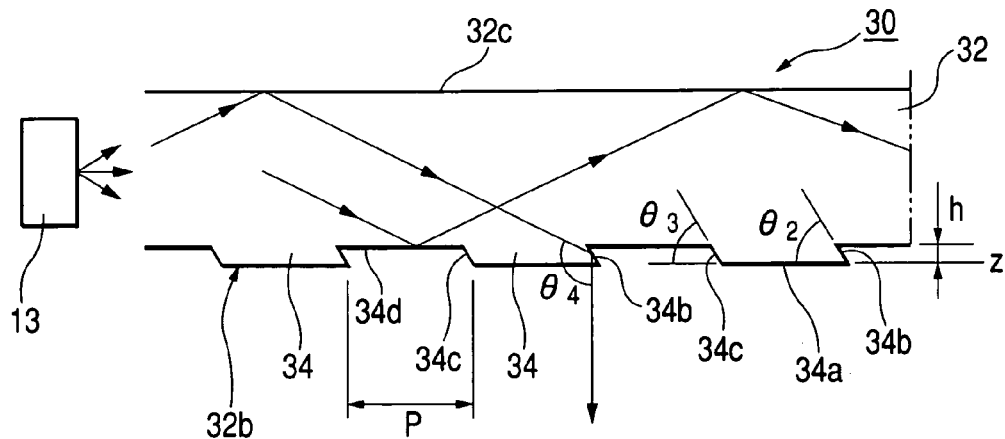
FIG. 5 is a partial sectional constructional view showing another mode of the front light in the present invention.

In the above embodiment mode, the explanation is made with respect to the front light having a shape in which the projecting stripe 14 is set to a wedge shape in section as the prism shape of the emitting face 12b of the light guide plate and the emitting face 12b is set to a saw blade shape seen in section. However, the prism shape of this emitting face 12b is not limited to the above shape, but may be set so as to have a structure able to efficiently emit the illumination light by utilizing the above steep slanting face portion. FIG. 5 is a view showing a partial sectional structure of the front light having a light guide plate having the emitting face 32b which is approximately formed in a rectangular wave shape in section and has plural projecting stripes arranged and approximately formed in a trapezoidal shape in section in another embodiment mode of the illuminating device in the present invention.

The front light 30 shown in FIG. 5 has the light guide plate 32 having the partial sectional structure shown in FIG. 5 instead of the light guide plate 12 of the front light 10 shown in FIGS. 1 and 2. Its entire external appearance is approximately similar to that of the front light 10 shown in FIG. 1.

The lower face side of the light guide plate 32 is set to an emitting face 32b, and the side opposed to the emitting face 32b is set to an opposite face 32c. Plural projecting stripes 34 extending in the direction perpendicular to the paper face are arranged and formed on the emitting face 32b, and the opposite face 32c is set to a flat face. The above projecting stripe 34 is approximately formed in a trapezoidal shape in section in which a flat portion 34a is set to a ceiling portion and a first slanting face portion (slanting face portion) 34b and a second slanting face portion 34c are formed on both sides of the flat portion 34a in its width direction. The above first slanting face portion 34b is inclined so as to have an inclination angle $\theta_2$ with respect to a horizontal reference face z. The second slanting face portion 34c is slantingly formed so as to have an inclination angle $\theta_3$ with respect to the horizontal reference face z.

The first slanting face portion 34b and the second slanting face portion 34c are inclined on the same side with respect to the normal line of the light guide plate 34.

The portion between adjacent projecting stripes 34, 34 is set to a bottom face portion 34d formed into a flat face. In the front light of this embodiment mode, a plane area of the emitting face 32b except for the above first and second slanting face portions 34b, 34c is formed so as to be a flat face parallel to the horizontal reference face z together with the flat portion 34a of the projecting stripe 34.

Similar to the inclination angle $\theta_2$ of the steep slanting face portion 14b shown in FIG. 3, the inclination angle $\theta_2$ of the above first slanting face portion 34b is constructed so as to generate reflection light in the direction for forming an obtuse angle ($\theta_4$) with respect to the propagating light incident to the first slanting face portion 34b. Similar to the projecting stripe 14 shown in FIG. 3, the pitch P and the height h of the projecting stripe 34 are constantly set within the emitting face 32b.

The inclination angle $\theta_3$ of the above second slanting face portion 34c is preferably set to the range of 40° or more and 60° or less. Light leaked out of the first slanting face portion 34b is reduced and brightness of the front light can be raised by setting the above range.

The light incident to the first slanting face portion 34b can be also effficiently reflected and can be set to illumination light by the front light 30 of this embodiment mode having the above construction so that the illumination light of high brightness is obtained. Further, since the light amount transmitted through the above first slanting face portion 34b and emitted to the opposite face 32c side is reduced, no contrast is reduced in the arranging case on the front face of the display device and the display of a high grade can be obtained.

Further, since the plane area of the emitting face 32b except for the slanting face portions 34b, 34c is set to the flat face, no light propagated within the light guide plate 32 is structurally easily leaked out of the face except for the slanting face portions. Thus, the utilization efficiency of a light source is raised and brightness of the illumination light can be improved.

In the above embodiment mode, the case that the illuminating device in the present invention is used as the front light, is explained. However, the illuminating device of the present invention can be also suitably used as a back light arranged and used on the rear face of the liquid crystal panel. In this case, the light guide plate face forming the above prism shape therein is arranged so as to be opposed to the rear face of the liquid crystal panel. The illumination light of high brightness is also obtained by this construction in comparison with the conventional back light, and the liquid crystal display device of bright display can be provided.

EMBODIMENT

In the following description, the effects of the present invention will be further clarified by embodiments, but the following embodiments do not limit the technical scope of the present invention.

Embodiment 1

Figure 6A:
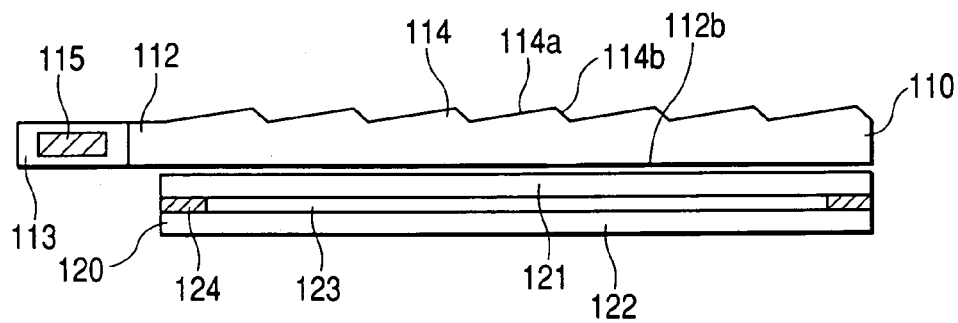
FIGS. 6A and 6B show a sectional structure of liquid crystal display devices having conventional illuminating devices.
Figure 6B:
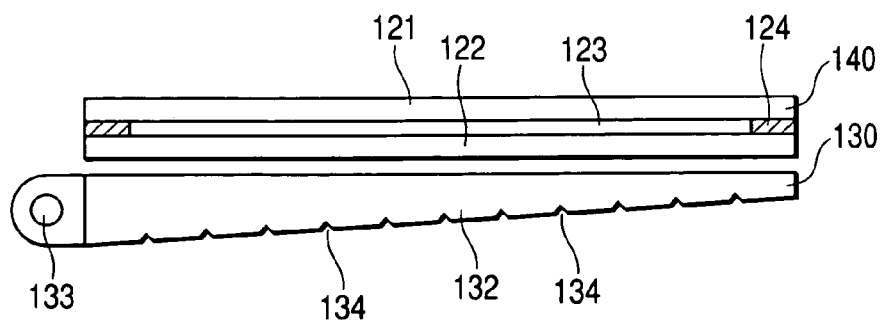
Figure 7:
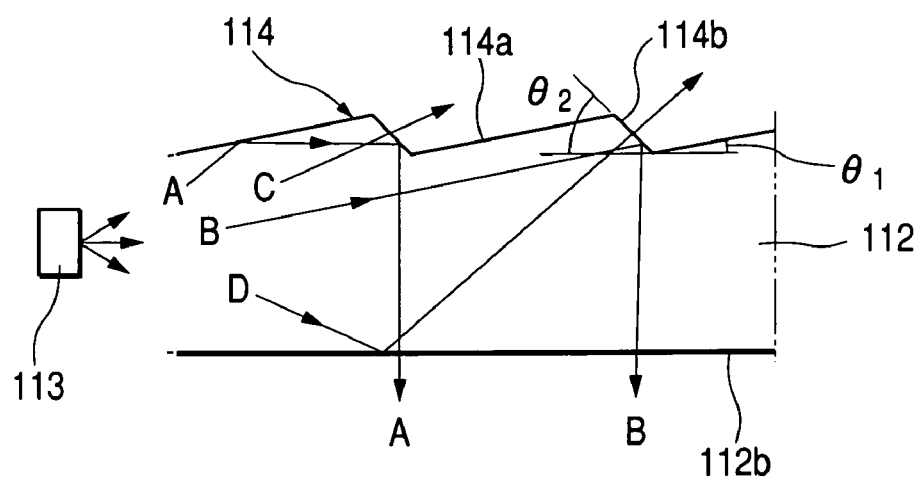
FIG. 7 is an explanatory view for explaining the light guide state of the front light shown in FIG. 6A.
Figure 8:
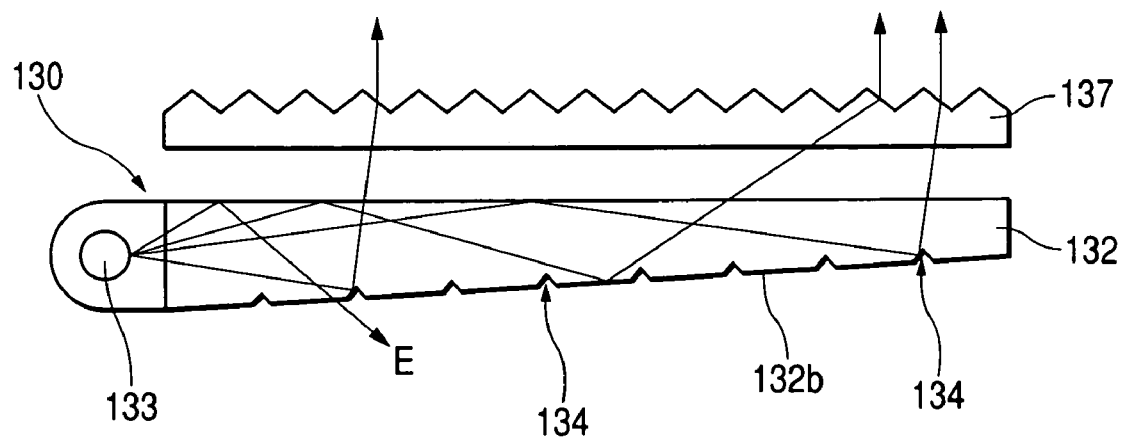
FIG. 8 is an explanatory view for explaining the light guide state of a back light shown in FIG. 6B.

In this example, the emitting light amount and the leaking light amount are compared with respect to the light guide plate of the present invention having a novel shape shown in each of FIGS. 1 to 3 and the light guide plate of a conventional shape shown in each of FIGS. 6 and 7 when the inclination angle of the slanting face portion for emitting the propagating light is optimized with respect to the incident angle of the propagating light.

Table 1 is a table summarizing and showing the parameters of respective portions of the light guide plate compared in this example. In this table, the novel shape shows the light guide plate shown in FIG. 3 and the conventional shape shows the light guide plate shown in FIG. 7. Further, $\theta_1$ and $\theta_2$ in the novel shape respectively show the inclination angles shown in FIG. 3, and $\theta_1$ and $\theta_2$ in the conventional shape respectively show the inclination angles shown in FIG. 7. The size of the light guide plate is commonly set to 70 mmW×50 mmL×1.0 mmt. The material of the light guide plate is set to acrylic resin in each case (refractive index is set to 1.48).

Next, Table 1 also shows the calculating results of a light beam emitted to the LCD side (liquid crystal panel side) and a light beam emitted to the observer side when the light beam of 1 Lumen is incident from the light incident face of the light guide plate of each shape in the above condition. As can be seen from Table 1, in the light guide plate of the novel shape having the construction of the present invention, it has been confirmed that the light beam emitted to the LCD side is greatly increased in comparison with the conventional shape, and the light beam leaked out to the observer side is greatly reduced. In particular, it has been confirmed that the light guide plate having high illumination brightness and a small leaking light amount is obtained if the inclination angle $\theta_2$ of the steep slanting face portion 14b is set to the range of 45° to 50°.

TABLE 1

| | | | | light beam (Lumen) | |
| --- | --- | --- | --- | --- | --- |
| | $\theta_1$ (°) | $\theta_2$ (°) | pitch (μm) | LCD side | observer side |
| novel shape | 2.8 | 40 | 0.2 | 0.770 | 0.063 |
| ↑ | 2.8 | 45 | 0.2 | 0.800 | 0.043 |
| ↑ | 2.8 | 50 | 0.2 | 0.790 | 0.032 |
| ↑ | 2.8 | 60 | 0.2 | 0.740 | 0.090 |
| conventional shape | 2.8 | 45 | 0.2 | 0.540 | 0.150 |

Embodiment 2

Next, reflection characteristics with respect to the propagating light incident from the interior of the light guide plate are compared with respect to the projecting stripe 14 formed on the emitting face 12b of the light guide plate 12 in the present invention shown in FIG. 3; and the projecting stripe 114 formed on the upper face of the conventional light guide plate 112 shown in FIG. 7. The compared results are shown in the following Tables 2 to 5. Tables 2 and 3 show the reflection characteristics of the novel shapes of the light guide plate in the present invention. Tables 4 and 5 show the reflection characteristics of the conventional shapes. Tables 2 and 4 show the results when the constructional material of the light guide plate is set to arton (product name: manufactured by JSR Corporation). Tables 3 and 5 show the results when the constructional material of the light guide plate is set to acrylic resin.

In these tables, for example, the light incident angle corresponds to angle $\theta_6$ in the figure shown in FIG. 4 in Table 2 and 3, and shows the angle of light incident from the internal side of the light guide plate 12 to the steep slanting face portion 14b with respect to the horizontal reference face z. Further, with respect to positiveness and negativeness of the light incident angle, the light incident angle of light advanced from the interior of the light guide plate toward the steep slanting face portion 14b is set to be positive. Even when the positiveness and the negativeness of the light incident angle are the same in the novel shape and the conventional shape, the light incident angle shows the angle of light directed from the upper face of the light guide plate to the lower face in the novel shape, and also shows the angle of light directed from the lower face of the light guide plate to the upper face in the conventional shape. In this embodiment, the above light incident angle is changed in the range of 0° to 8°.

The inclination angle shows the inclination angle $\theta_2$ of the steep slanting face portion 14b in Tables 2, 3, and also shows the inclination angle $\theta_2$ of the steep slanting face portion 114b shown in FIG. 7 in Tables 4, 5. In this example, this inclination angle is an inclination, angle for reflecting the light incident at each of the above light incident angles in the direction perpendicular to the light guide plate (the direction normal to the horizontal reference face z).

A margin angle shows the difference between the incident angle of the propagating light incident to the steep slanting face portion and a critical angle of the light guide plate when the inclination angle $\theta_2$ of the steep slanting face portion is set so as to generate reflection light in the direction perpendicular to the light guide plate with respect to the above light incident angle. When the margin angle is negative, the incident angle is shallower than the critical angle and the light is transmitted through the steep slanting face portion and becomes leaking light.

TABLE 2

<Novel shape 1>

| Light incident angle $\theta_6$ (°) | 0 | 1 | 2 | 3 | 4 | 5 | 6 | 7 | 8 |
|---|---|---|---|---|---|---|---|---|---|
| Inclination angle $\theta_2$ (°) | 45 | 45.5 | 46 | 46.5 | 47 | 47.5 | 48 | 48.5 | 49 |
| margin angle (°) | 3.86 | 3.36 | 2.86 | 2.36 | 1.88 | 1.36 | 0.86 | 0.36 | −0.14 | material: arton/refractive index: 1.52/critical angle: 41.14°

TABLE 3

<Novel shape 2>

| Light incident angle $\theta_6$ (°) | 0 | 1 | 2 | 3 | 4 | 5 | 6 | 7 | 8 |
|---|---|---|---|---|---|---|---|---|---|
| Inclination angle $\theta_2$ (°) | 45 | 45.5 | 46 | 46.5 | 47 | 47.5 | 48 | 48.5 | 49 |
| margin angle (°) | 2.49 | 1.99 | 1.49 | 0.99 | 0.49 | −0.01 | −0.51 | −1.01 | −1.51 | material: acrylic/refractive index: 1.48/critical angle: 42.51°

TABLE 4

<Conventional shape 1>

| Light incident angle (°) | 0 | −1 | −2 | −3 | −4 | −5 | −6 | −7 | −8 |
|---|---|---|---|---|---|---|---|---|---|
| Inclination angle $\theta_2$(°) | 45 | 44.5 | 44 | 43.5 | 43 | 42.5 | 42 | 41.5 | 41 |
| Margin angle (°) | 3.86 | 2.36 | 0.86 | −0.64 | −2.14 | −3.64 | −5.14 | −6.64 | −6.14 | material: arton/refractive index: 1.52/critical angle: 41.14°

TABLE 5

<Conventional shape 2>

| Light incident angle (°) | 0 | −1 | −2 | −3 | −4 | −5 | −6 | −7 | −8 |
|---|---|---|---|---|---|---|---|---|---|
| Inclination angle $\theta_2$(°) | 45 | 44.5 | 44 | 43.5 | 43 | 42.5 | 42 | 41.5 | 41 |
| margin angle (°) | 2.49 | 0.99 | −0.51 | −2.01 | −3.51 | −5.01 | −6.51 | −8.01 | −9.51 | material: acrylic/refractive index: 1.48/critical angle: 42.51°

As shown in the above Tables 2 to 5, with respect to the light guide plate of the novel shape having the construction of the present invention, the light incident angle range having a positive margin angle is widened in comparison with the light guide plate of the conventional shape. Namely, in the light guide plate of the novel shape, the propagating light of a wider angle range can be reflected in an angle distribution of the propagating light incident to the steep slanting face portion so that illumination brightness is raised.

As explained above in detail, the illuminating device of the present invention comprises a light source and a light guide plate for introducing light of the light source from a side end face to the interior and emitting the light propagated in the interior from an emitting face; and a prism shape for reflecting the propagating light within the light guide plate and emitting the propagating light to the emitting face side is formed on the emitting face of the light guide plate. Thus, it is possible to effectively prevent the light propagated within the light guide plate from being leaked out of the face on the side opposed to the emitting face. Accordingly, for example, if the illuminating device of the above construction is used as the front light of the display device, the leaking light in the front face direction of the display device can be greatly reduced and the display of high contrast can be obtained. Further, since the face on the side opposed to the emitting face of the light guide plate can be set to a flat face, this flat face is arranged on the side of a display face when the present invention is applied to the front light of the display device. Therefore, the advantage that the above prism shape can be protected can be obtained.

Further, in accordance with the liquid crystal display device of the present invention, the display of high brightness is obtained by the above illuminating device of high brightness for reducing the leaking light. The display of high contrast is obtained in accordance with the liquid crystal display device having the illuminating device of the present invention as the front light.

What is claimed is:

1. An illuminating device comprising:
    a light source; and
    a light guide plate for introducing light of the light source from a side end face to an interior and emitting said light propagated in the interior from an emitting face opposing an illuminated body to illuminate said illuminated body, wherein
    a prism shape for reflecting the propagating light within the light guide plate and emitting the propagating light to said emitting face side is formed on the emitting face of said light guide plate,
    said prism shape is constructed by plural projecting stripes formed on said emitting face, and a slanting face portion is formed on an advancing direction side of said propagating light of said projecting stripe, and
    an inclination angle of said slanting face portion is set to 40° or more and 60° or less,
    wherein an angle formed between an advancing direction of the propagating light incident to said slanting face portion and an advancing direction of reflected light of the propagating light is an obtuse angle.

2. The illuminating device according to claim 1, wherein the angle formed between The advancing direction of the propagating light incident to said slanting face portion and the advancing direction of the reflected light of the propagating light is set to 90° or more and 150° or less.

3. The illuminating device according to claim 1, wherein an inner face of said slanting face portion is formed so as to be directed to an outer face side of said emitting face.

4. The illuminating device according to claim 1, wherein each of said projecting stripes is approximately formed in a trapezoidal shape seen in section in which a flat portion is formed in a top portion of the projecting stripe.

5. The illuminating device according to claim 1, wherein each of said projecting stripes is formed in a wedge shape seen in section.

6. The illuminating device according to claim 1, wherein said light source has a bar light guide body arranged along the side end face of said light guide plate, and also has a light emitting element arranged in an end face portion of the bar light guide body.

7. A liquid crystal display device comprising an illuminating device according to claim 1 is arranged on the front face or the rear face of a liquid crystal panel.

8. An illuminating device comprising:
    a light source; and
    a light guide plate for introducing light of the light source from a side end face to an interior and emitting said light propagated in the interior from an emitting face,
    wherein a prism shape for reflecting the propagating light within the light guide plate and emitting the propagating light to said emitting face side is formed on the emitting face of said light guide plate, and
    wherein said light source has a bar light guide body arranged along the side end face of said light guide plate, and also has a light emitting element arranged in an end face portion of the bar light guide body,
    said prism shape is constructed by plural projecting stripes formed on said emitting face, and a slanting face portion is formed on an advancing direction side of said propagating light of said projecting stripe, and
    an inclination angle of said slanting face portion is set to 40° or more and 60° or less,
    wherein an angle formed between an advancing direction of the propagating light incident to said slanting face portion and an advancing direction of reflected light of the propagating light is an obtuse angle.

9. The illuminating device according to claim 8, wherein the angle formed between the advancing direction of the propagating light incident to said slanting face portion and the advancing direction of the reflected light of the propagating light is set to 90° or more and 150° or less.

10. The illuminating device according to claim 8, wherein an inner face of said slanting face portion is formed so as to be directed to an outer face side of said emitting face.

11. The illuminating device according to claim 8, wherein each of said projecting stripes is approximately formed in a trapezoidal shape seen in section in which a flat portion is formed in a top portion of the projecting stripe.

12. The illuminating device according to claim 8, wherein each of said projecting stripes is formed in a wedge shape seen in section.

* * * * *